(12) United States Patent
Morgan (10) Patent No.: US 11,246,366 B2
(45) Date of Patent: Feb. 15, 2022

(54) SELECTIVE DEPOSITION OF REFLECTIVE MATERIALS FOR AN APPAREL ITEM

(71) Applicant: NIKE, Inc., Beaverton, OR (US)

(72) Inventor: Daniel Morgan, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 426 days.

(21) Appl. No.: 15/982,150

(22) Filed: May 17, 2018

(65) Prior Publication Data

US 2018/0343944 A1 Dec. 6, 2018

Related U.S. Application Data

(60) Provisional application No. 62/513,060, filed on May 31, 2017.

(51) Int. Cl.

| | | |
|---|---|---|
| *A41D 31/04* | (2019.01) | |
| *A41H 3/00* | (2006.01) | |
| *G06Q 50/04* | (2012.01) | |
| *A41D 13/005* | (2006.01) | |
| *A41D 31/06* | (2019.01) | |
| *A41D 31/32* | (2019.01) | |
| *C23C 4/01* | (2016.01) | |
| *B29D 11/00* | (2006.01) | |
| *C23C 4/06* | (2016.01) | |
| *G02B 5/128* | (2006.01) | |

(52) U.S. Cl.
CPC ........... *A41H 3/007* (2013.01); *A41D 13/005* (2013.01); *A41D 31/06* (2019.02); *A41D 31/32* (2019.02); *B29D 11/00605* (2013.01); *C23C 4/01* (2016.01); *C23C 4/06* (2013.01); *G02B 5/128* (2013.01); *G06Q 50/04* (2013.01)

(58) Field of Classification Search
CPC ................................ A41D 31/00; A41D 31/04
See application file for complete search history.

(56) References Cited

U.S. PATENT DOCUMENTS

| | | | |
|---|---|---|---|
| 3,496,057 A * | 2/1970 | McCluer | A41D 31/085 428/549 |
| 4,147,829 A | 4/1979 | Holland | |
| 4,645,704 A | 2/1987 | Hellwig | |

(Continued)

FOREIGN PATENT DOCUMENTS

WO 2012073095 A1 6/2012

OTHER PUBLICATIONS

Vernez et al. Anatomical exposure patterns of skin to sunlight: relative contributions of direct, diffuse and reflected ultraviolet radiation. British Journal of Dermatology. vol. 167, Issue 2 pp. 383-390 Aug. 2012 (Year: 2012).*

(Continued)

*Primary Examiner* — Cachet I Proctor
(74) *Attorney, Agent, or Firm* — Shook, Hardy & Bacon L.L.P.

(57) ABSTRACT

A garment with reflective material applied to an outer surface of the garment is provided herein. The reflective material is positioned on the garment based on modeled sun exposure. A method for modeling sun exposure to determine the positioning of reflective material on a garment is also provided herein. A system for modeling sun exposure, determining the position of reflective material on a garment, and applying the reflective material to the outer surface of the garment is also provided.

15 Claims, 6 Drawing Sheets

(56) References Cited

U.S. PATENT DOCUMENTS

| | | | |
|---|---|---|---|
| 4,923,743 A * | 5/1990 | Stewart, Jr. | B05B 7/0884 |
| | | | 427/288 |
| 5,157,788 A | 10/1992 | Schultz | |
| 5,264,063 A | 11/1993 | Martin | |
| 5,824,390 A | 10/1998 | Ochi et al. | |
| 5,883,740 A * | 3/1999 | Chubb | A41D 1/00 |
| | | | 359/350 |
| 5,988,821 A | 11/1999 | Tanaka et al. | |
| 6,734,980 B1 * | 5/2004 | Brash | G01B 11/245 |
| | | | 356/601 |
| 7,172,785 B2 | 2/2007 | Thompson et al. | |
| 8,359,675 B2 | 1/2013 | Terrell | |
| 9,542,069 B2 | 1/2017 | Mulligan et al. | |
| 9,596,896 B2 | 3/2017 | Coza et al. | |
| 2007/0074328 A1 | 4/2007 | Melhart et al. | |
| 2009/0090865 A1 * | 4/2009 | Lub | G01J 1/50 |
| | | | 250/331 |
| 2010/0251455 A1 * | 10/2010 | Lampe | B05D 5/063 |
| | | | 2/93 |
| 2010/0263109 A1 | 10/2010 | Noerenberg et al. | |
| 2012/0278978 A1 | 11/2012 | Wakatsuki et al. | |
| 2013/0105299 A1 | 5/2013 | Kim | |
| 2013/0202910 A1 | 8/2013 | Koppe | |
| 2014/0082815 A1 * | 3/2014 | Harber | A41B 11/003 |
| | | | 2/69 |
| 2014/0356574 A1 | 12/2014 | Conolly et al. | |
| 2015/0302597 A1 * | 10/2015 | Bentson | G06K 9/00221 |
| | | | 345/633 |
| 2015/0309219 A1 * | 10/2015 | Butz | G02B 5/0891 |
| | | | 359/361 |
| 2016/0165978 A1 | 6/2016 | McEwen | |
| 2016/0287970 A1 | 10/2016 | Charles | |
| 2016/0302503 A1 | 10/2016 | Birutis et al. | |
| 2018/0249944 A1 * | 9/2018 | Poutiatine | G16H 40/63 |
| 2018/0271184 A1 * | 9/2018 | Shalev | A41D 1/06 |

OTHER PUBLICATIONS

Weihs et al. Measurements of Personal UV Exposure on Different Parts of the Body During Various Activities. Photochemistry and Photobiology. vol 89. Issue 4. Jul. 2013 Abstract (Year: 2013).*

Measurements of Personal UV Exposure on Different Parts of the Body During Various Activities. Photochemistry and Photobiology vol. 89, Issue 4 Jul./Aug. 2013 pp. 1004-1007. (Year: 2013).*

Anonymous: "LEITAT Technological Center", Oct. 21, 2016 (Oct. 21, 2016), XP055495547, Retrieved from the Internet: URL:https://web.archive.org/web/20161021011321if_/http://www.t-pot.eu:80/docs/Workshops/LEITAT_1_Innovative_Textile_Finishing.pdf; Retrieved on Jul. 26, 2018, pp. 52, 54-56.

D. Vernez et al: "Anatomical exposure patterns of skin to sunlight: relative contributions of direct, diffuse and reflected ultraviolet radiation", British Journal of Dermatology, vol. 267, No. 2, Aug. 1, 2012 (Aug. 1, 2012), pp. 383-390, XP055320459, UK, ISSN: 0007-0963, DOI: 10.1111/j.1365-2133.2012.10898.x sections "Implementation" and "Geographic irradiance source"; figure 3, table 1.

"Alchemi Sun Hats", https://www.alchemilabs.com/technology Accessed Apr. 6, 2017.

"What is a Radiant Barrier"; May 17, 2015; https://www.radiantguard.com/pages/radiantbarrier. http://web.archive.org/web/20150517031932/http://www.radiantguard.com/pages/radiant-barrier.

International Search Report and Written Opinion dated Aug. 7, 2018 in International Patent Application No. PCT/US2018/034095, 16 pages.

International Preliminary Report on Patentability dated Dec. 12, 2019 in International Patent Application No. PCT/US2018/034095, 9 pages.

Office Action received for European Patent Application No. 18735734.8, dated Apr. 23, 2021, 6 pages.

* cited by examiner

SELECTIVE DEPOSITION OF REFLECTIVE MATERIALS FOR AN APPAREL ITEM

CROSS-REFERENCE TO RELATED APPLICATIONS

This application claims the benefit of priority to U.S. Provisional Application No. 62/513,060, filed May 31, 2017 and entitled "Selective Deposition of Reflective Materials for an Apparel Item." The entirety of the aforementioned application is incorporated by reference herein.

STATEMENT REGARDING FEDERALLY SPONSORED RESEARCH OR DEVELOPMENT

Not applicable.

TECHNICAL FIELD

The aspects hereof relate to selective deposition of reflective materials on an apparel item.

BACKGROUND

Reflective materials may be positioned on apparel items for a number of different reasons such as safety, cooling, or heating.

BRIEF DESCRIPTION OF THE DRAWINGS

The present invention is described in detail below with reference to the attached drawings figures, wherein.

DETAILED DESCRIPTION

The subject matter of the present invention is described with specificity herein to meet statutory requirements. However, the description itself is not intended to limit the scope of this disclosure. Rather, the inventors have contemplated that the disclosed or claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Aspects herein are generally directed to the selective application or deposition of reflective material(s) on the outer surface of a garment, such as a shirt, pants, shorts, jersey, swimming suit, and the like. Further, the location(s) of the selective application may be, at least partially, based on a determined area(s) of sun exposure. By positioning the reflective material on the outer-surface of the garment based on the area(s) of sun exposure, the garment can protect the wearer's skin from potentially harmful exposure to the sun. Further, the garment can potentially prevent the wearer from overheating by reflecting the sun light. This may be important in athletic apparel and/or outdoor apparel where the garment may exhibit performance characteristics such as, for example, faster drying times, moisture-management characteristics that help transport sweat or perspiration away from the body, breathability characteristics that facilitate the passage of moisture vapor through the fabric, permeability characteristics that facilitate the passage of air through the fabric, and the like.

In some aspects, the area(s) of sun exposure may be determined by computer modeling of a three-dimensional (3-D) human body in simulated environments. As discussed in more detail below, the modeling may allow a highly customizable analysis of maximum sun exposure, average sun exposure, the potential wearer, the garment's intended activity, the potential geographic location of use, the potential time of use, the weather forecast, and/or the potential duration of use.

An aspect discussed herein relates to a system for manufacturing a garment with reflective material deposits. In an aspect, the system may comprise an input device configured to receive a data file comprising a representation of areas of sun exposure on a 3-D model of a human body, at least one computing device configured to receive the data file from the input device and convert the data file into reflective material deposition instructions, and a spraying device communicatively coupled with the at least one computing device and configured to receive the reflective material deposition instructions from the computing device and apply the reflective material to a garment.

Another aspect discussed herein relates to a method of manufacturing a garment having reflective material. In an aspect, the method may comprise receiving a garment having an outer surface; receiving a representation of areas of sun exposure on a 3-D model of a human body; determining, based on the areas of sun exposure, a first zone on the outer surface of the garment for application of the reflective material; and applying the reflective material to the outer surface of the garment in the first zone.

Yet another aspect discussed herein relates to a garment with deposits of reflective material. In an aspect, the garment may comprise an outer surface and an inner surface, the outer surface of the garment may comprise at least a first zone with a continuous reflective material deposited thereon, at least a second zone with a gradient reflective material deposited thereon, and at least a third zone without reflective material deposited thereon, wherein a location of the first zone, the second zone, and the third zone is based on a determined average sun exposure.

Figure 2A:
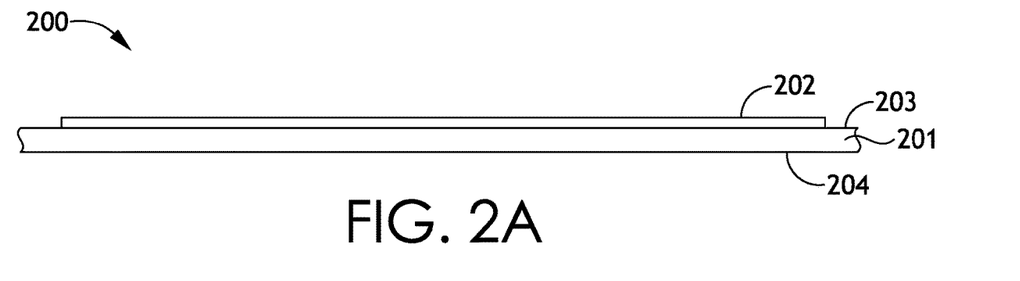
FIG. 2A illustrates a continuous application of a reflective material on an outer surface of a portion of an exemplary garment in accordance with aspects thereof.
Figure 2B:
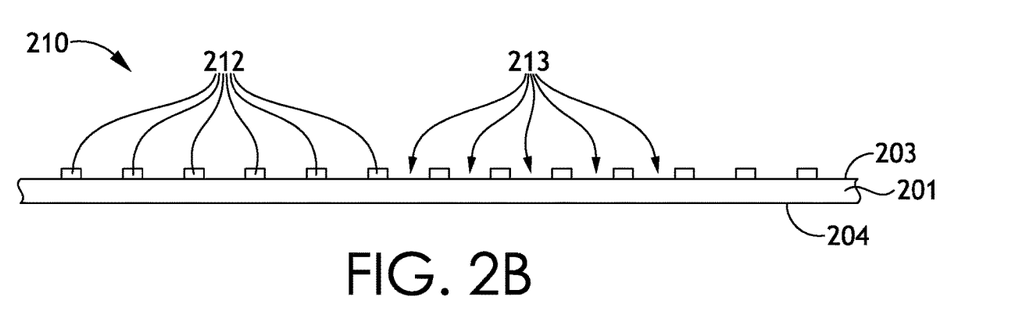
FIG. 2B illustrates an exemplary gradient profile of a reflective material on an outer surface of a portion of an exemplary garment in accordance with aspects thereof.
Figure 2C:
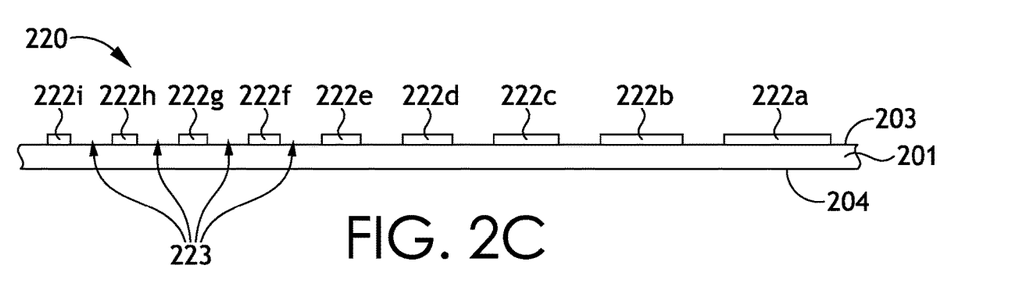
FIG. 2C illustrates another exemplary gradient profile of a reflective material on an outer surface of a portion of an exemplary garment in accordance with aspects thereof.

As used throughout this disclosure, the term "reflective material" may be defined as a material that when applied to a surface is capable of, at least partially, reflecting visible and non-visible wavelengths of light. In some aspects, the reflective material may comprise metallic, metallized, and/or nonmetallic substances. Exemplary reflective materials may comprise liquid, aqueous, vaporized, or powdered metals such as aluminum (Al), zinc (Zn), nickel (Ni), copper (Cu), silver (Ag), tin (Sn), cobalt (Co), manganese (Mn), iron (Fe), magnesium (Mg), lead (Pb), chromium (Cr), and/or alloys therein. Further, exemplary reflective materials may comprise compounds comprising metals such as metalized biaxially-oriented polyethylene terephthalate (BoPET), commonly known by the trade name Mylar®, Milenex, and Hostaphan, and metalized polyethylene terephthalate (PET). Other exemplary reflective materials may comprise semi-metallic substances such as silicon (Si) and silicon containing compounds. Further exemplary reflective materials may comprise non-metallic substances such as BoPET and PET. As used throughout this disclosure, terms such as "a continuous layer" or "a continuous application" may be defined as a substantially homogenous layer or application of a reflective material such as depicted by FIG. 2A. To describe it another way, the term "continuous" as used in reference to deposits of reflective material means a deposit of reflective material without substantial interruption. The term "continuous" as used herein is meant to encompass a deposit having unintentional, intermittent, isolated interruptions or gaps (e.g., from a manufacturing defect, due to fabric irregularities, due to naturally occurring spaces or gaps between yarns in a knit or woven textile, caused by wear or manipulation of the textile, and the like). "Gradient application" or "a gradient layer" may be defined as an intentionally intermittent or interrupted deposit, or stopping a first deposit of reflective material and starting a second deposit of reflective material at some point subsequent; such a discontinuous deposit resulting in a trailing edge of the first deposit and a leading edge of a second deposit thereby. Additionally, a "gradient" as used herein is meant to encompass an increase or decrease in the magnitude of concentration of reflective material from one point on the garment/model to another point on the garment/model. Notably, gradient may refer to a static increase or decrease (such as depicted in FIG. 2B as compared to FIG. 2A), a dynamic increase or decrease (such as depicted in FIG. 2C and/or FIG. 2D), or a combination of both static and dynamic increases or decreases in the magnitude of concentration of reflective material. Further, as used throughout this disclosure, positional terms such as "front," "back," "top," "bottom," and the like are to be given their common meaning with respect to an appropriately sized garment being worn as intended and as described herein by a hypothetical wearer standing in an upright position.

Figure 1A:
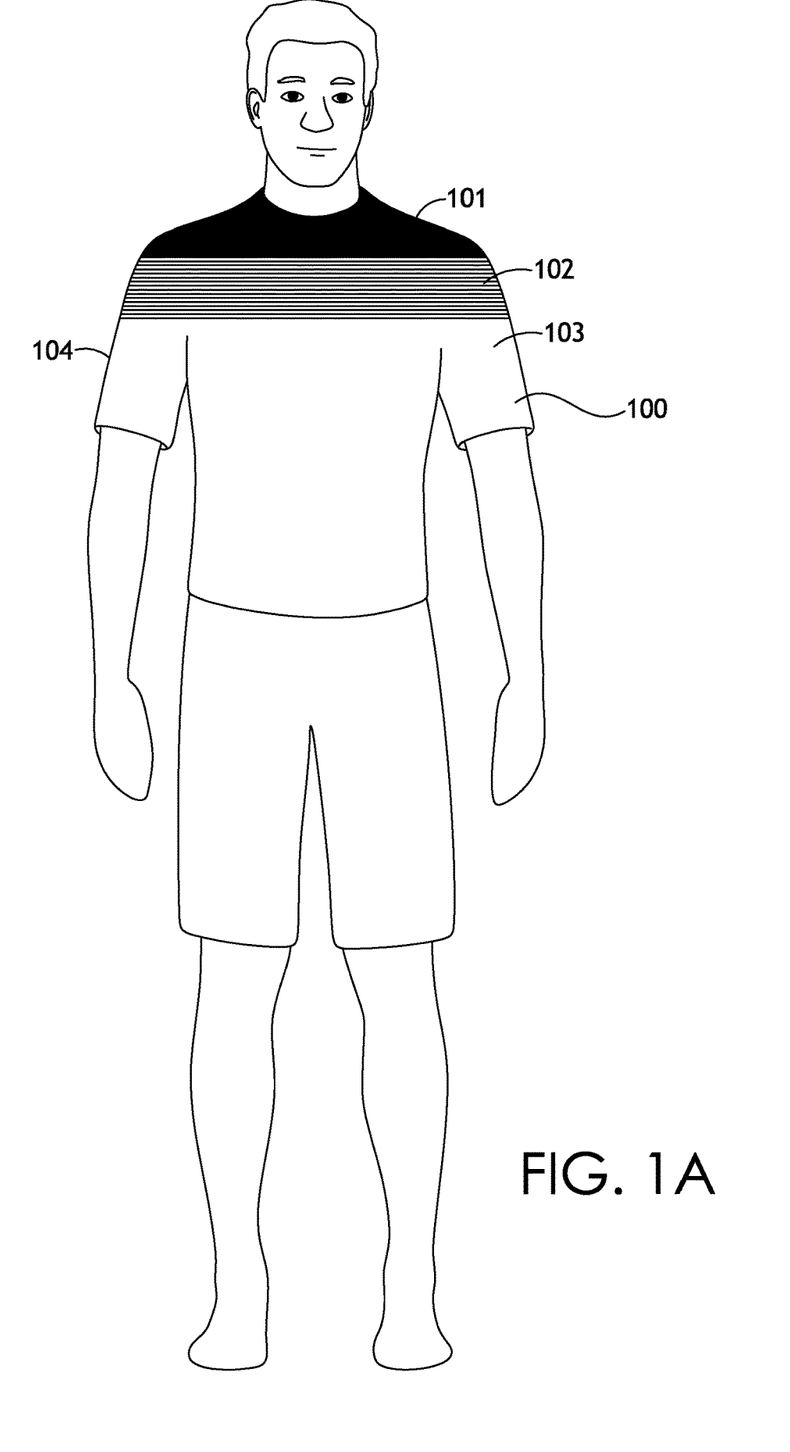
FIG. 1A-1C illustrate a front view, a side view, and a rear view respectively of an exemplary garment with a first zone of continuous reflective material and a second zone of gradient reflective material in accordance with aspects thereof.
Figure 1B:
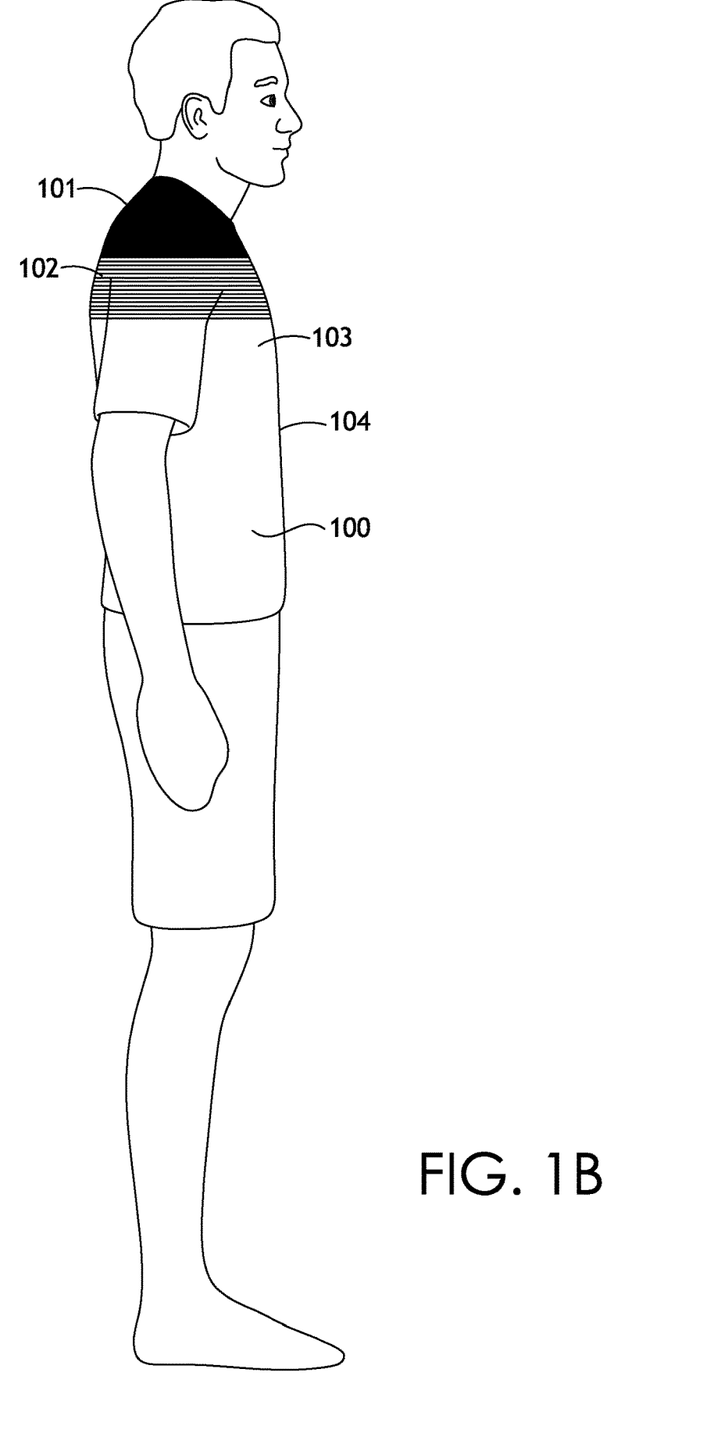
Figure 1C:
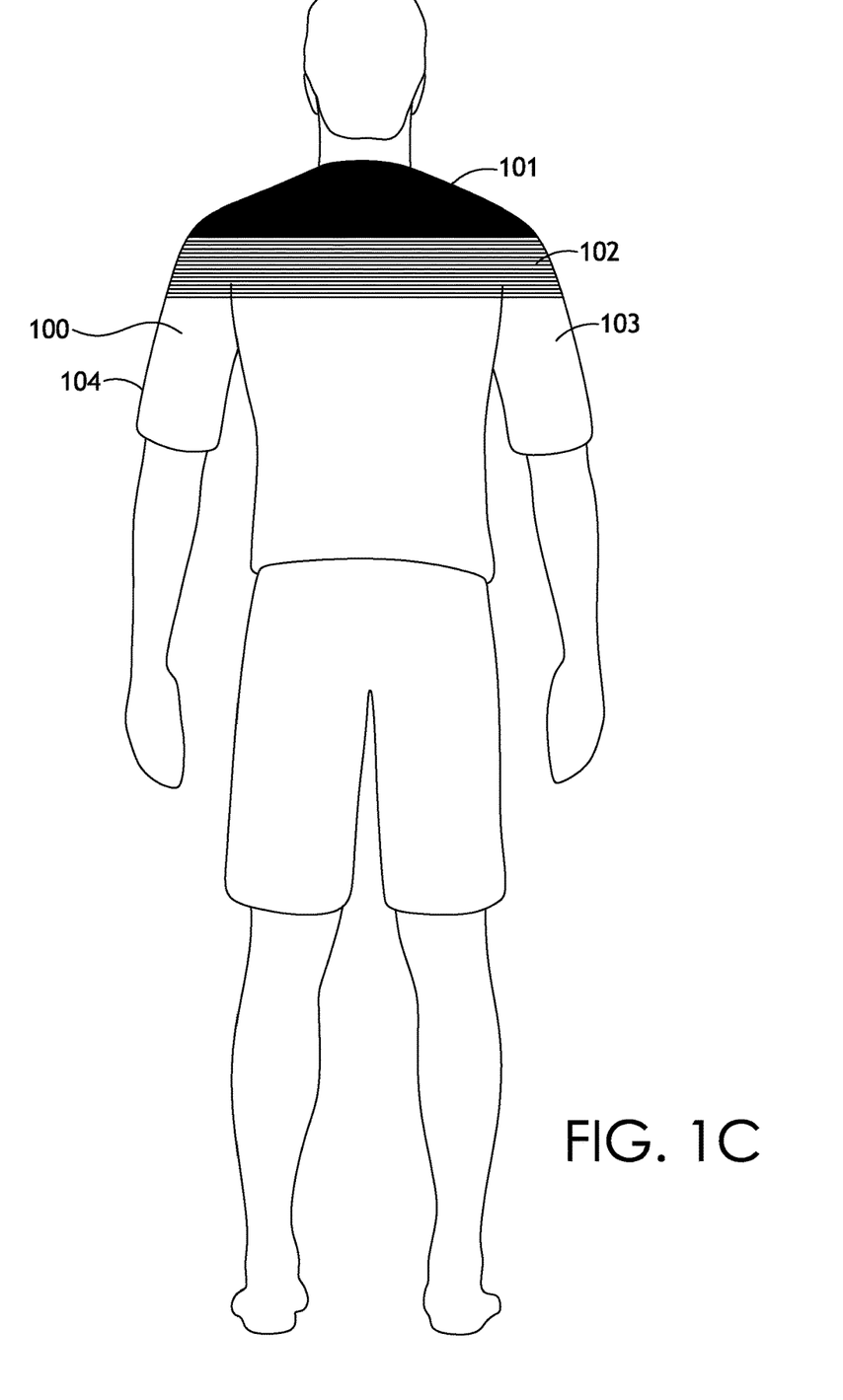

FIGS. 1A-1C depict a front view (FIG. 1A), a side view (FIG. 1B), and a rear view (FIG. 1C) of an exemplary garment 100 in accordance with aspects herein. The figures are provided to illustrate a zonal application of a reflective material based, at least partially, on areas of sun exposure in accordance with aspects herein. In aspects, the exemplary garment 100 may comprise an outer surface 104 and an inner surface (not shown), the outer surface 104 of the garment 100 comprising at least a first zone 101 with a continuous reflective material deposited thereon, at least a second zone 102 with a gradient reflective material deposited thereon, and at least a third zone 103 without reflective material deposited thereon, wherein a location of the first zone 101, the second zone 102, and the third zone 103 is based on a determined average sun exposure. In aspects, the first zone 101 may be substantially similar to depiction 200 as described in reference to FIG. 2A. In aspects, the second zone 102 may be substantially similar to depiction 210, 220, and/or 230 as described in reference to FIGS. 2B-2D. Although FIGS. 1A-1C depict the gradient profile of the second zone 102 as continuous concentric rings, the gradient profile of the second zone may comprise a plurality of configurations. For example, the reflective material within the gradient profile of the second zone 102 may comprise, dots, circles, ellipses, parallelograms, crescents, and/or any shape, including random shapes, pseudo-random shapes and/or organic shapes.

Using the systems and methods described herein, and as depicted in FIGS. 1A-1C, it may be determined that sun light will strike the top of the shoulders, top of the chest, and top of the back of a wearer during certain times of the day. For example, a wearer may anticipate wearing exemplary garment 100 on the equator at 12:00 PM (noon) while playing soccer. In such a case, a first zone, such as first zone 101, may be determined to comprise the top of the shoulders, top of the chest, and top of the back of exemplary garment 100. In turn, the first zone 101 of exemplary garment 100 may have a continuous application of reflective material, such as continuous layer 202 in FIG. 2A, to provide maximum reflection of the sun light. Further, it may be determined that sun light will strike the front, sides, and back of the shoulders, upper chest, and upper back of the wearer. However, the intensity and/or duration of the sun exposure may be determined to be less than the sun exposure of the first zone 101, for example. In such a case, a second zone, such as second zone 102, may be determined to comprise the front, sides, and back of the shoulders, upper chest, and upper back of exemplary garment 100. In turn, the second zone 102 of exemplary garment 100 may have a gradient application of reflective material, such as gradient profile 210, 220, and/or 230 of FIGS. 2B, 2C and 2D respectively to provide some reflectivity of the sun light. Yet further, it may be determined that merely incidental, insignificant, and/or no sun light will strike the upper arm, the middle and lower chest, and the middle and lower back of the wearer. In such a case, a third zone, such as third zone 103, may be determined to comprise the upper arm, the middle and lower chest, and the middle and lower back of exemplary garment 100. In turn, the third zone 103 of exemplary garment 100 may be without reflective material applied thereon.

Figure 3:
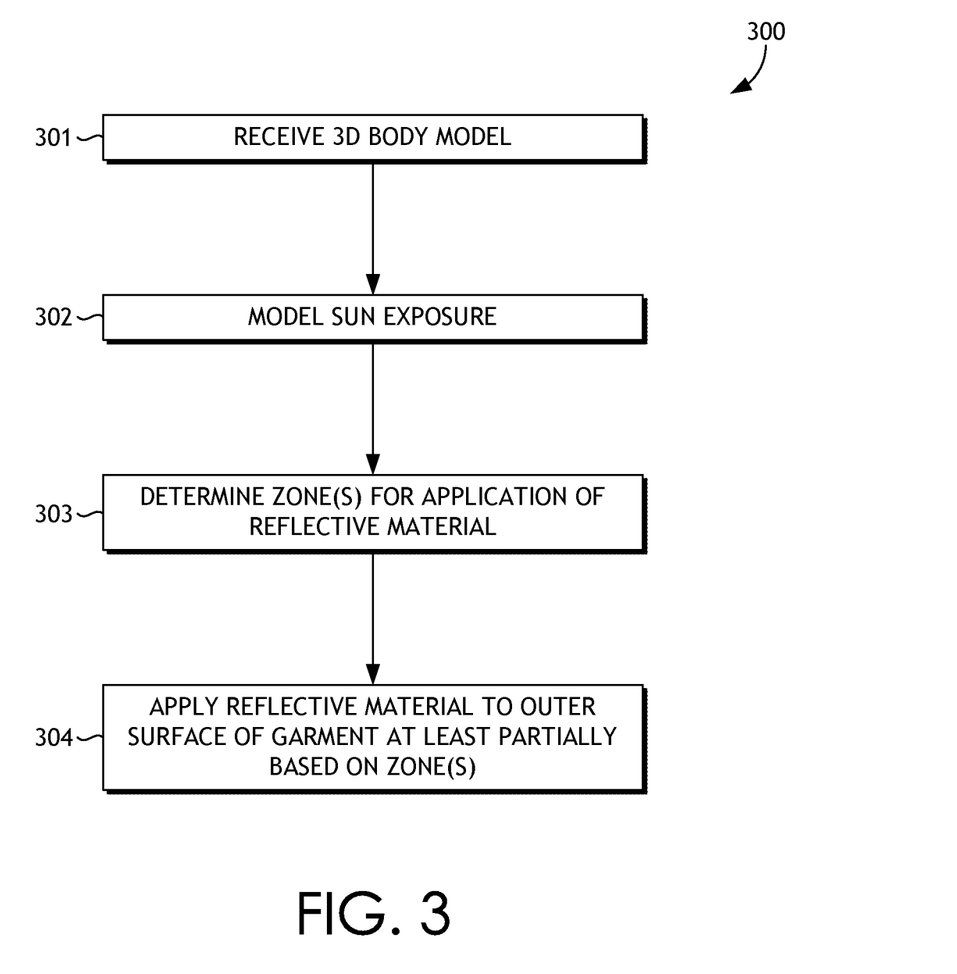
FIG. 3 illustrates a flow diagram of an exemplary method for selective deposition of reflective material based on sun exposure in accordance with aspects thereof.

To provide a better understanding of aspects herein, FIG. 3 will now be discussed. FIG. 3 depicts a flow diagram of an exemplary method 300 for selective deposition of reflective material on a garment in accordance with aspects herein. Generally, the exemplary method 300 comprises receiving a 3-D model of the human body, modeling areas of sun exposure on the 3-D model, determining at least one zone for the application of a reflective material, and applying the reflective material to an outer surface of the garment at least partially based on the determined zones. Aspects of the method 300 may facilitate the production of a garment with deposits of reflective material on the outer surface, such as exemplary garment 100. Some aspects of method 300 may be facilitated, at least in part, by the systems described herein, such as exemplary system 400.

At block 301, a 3-D model of the human body is received by an input device and/or generated by the input device. In some aspects of block 301, the 3-D model may comprise a generic model of a human, a gender specific generic model (generic male/generic female), and/or a customizable model. For example, a generic model may be a three-dimensional representation of a human of average height, weight, and proportion. The gender specific generic model(s) may be a three-dimensional representation of a male of average height, weight, and proportion and/or a female of average height, weight, and proportion. The customizable model may be a three-dimensional representation where: gender can be modified, by for example selecting male or selecting female; height can be modified by providing the desired height; weight can be modified by providing the desired weight; and, proportions can be modified by providing the desired values. In some aspects, the customizable model may be associated with predetermined height, weight, and proportions for various "standard" garment sizes. For example, women's/men's small, women's/men's medium, women's/men's large, women's/men's extra-large, and so forth. As used herein, "proportion" is used in reference to measurements of the human body. For example, waist circumference, chest circumference, thigh circumference, distance between shoulder and elbow, distance between elbow and wrist, distance between hip and knee, distance between knee and foot, and the like. It will be understood by those in the art that the preceding example is merely illustrative of various proportions; as such, it is not intended to limit the scope herein. Any and all aspects and any variations are contemplated as being within the scope herein.

In some aspects of block 301, the 3-D model may be a three-dimensional representation of a particular person and/or a particular type of person. For example, the 3-D model may be a product of a body scan, motion capture, composite image of an individual, and/or the like. As such, in some aspects, the 3-D model may be a substantially identical digital representation of the particular person. Further, the 3-D model may be representative of a type of person. For example, the 3-D model may be representative of the prototypical/average person who plays a particular sport or activity (e.g., football, soccer, baseball, golf, rugby, swimming, cross-country, track and field, fishing, and the like) and/or a position within a particular sport. Further, the 3-D model may be representative of the prototypical/average person at a given "level" of a particular sport or activity. In other words, a given 3-D model may be representative of the prototypical/average MLS player, NFL wide receiver, collegiate platform diver, PGA Tour Pro, AAA pitcher, Olympic marathoner, or the like. For another example, the 3-D model may be representative of the prototypical/average person who plays for a particular team. Any and all aspects, and any variation thereof, are contemplated as being within the scope herein.

In block 302, sun exposure is modeled on the 3-D model. In general, modeling sun exposure involves computer mapping of how light, such as solar light rays, strikes the surface of a target object. In some aspects of block 302 the 3-D model received in block 301 may be used as a target object to model sun exposure. In some aspects, the target object may be used as an input into a computer program configured to model sun exposure. For example, computer programs such as Grasshopper®, Ladybug®, and Rhinoceros® (Rhino®) may be used to model sun exposure on the target object. In some aspects, a representation of a garment may be used as a target object. Further, in some aspects a representation of a garment may be "worn" by a 3-D model and the combination of which may be used as the target object. In some aspects of block 302, the sun exposure model may be used to create a map of sun exposure for different parts of the 3-D model.

In some aspects of block 302, the sun exposure may be modeled based on one or more environmental variables. In an aspect, the sun exposure may be modeled on the 3-D model based on at least one environmental variable. In some aspects, a computer program may simulate, model, calculate, emulate, and/or predict the mean, median, mode, maximal, and/or minimal sun exposure for the 3-D model based on the at least one environmental variable. Further, the computer program may create a map of the sun exposure on the 3-D model which may indicate a level of sun exposure. In some aspects, levels of sun exposure may be a relative numeric value, for example a number between 0 and 100. In an aspect, a level may be a classification of high, medium, low, and/or incidental sun exposure. Any and all aspects, and any variation thereof, are contemplated as being within aspects herein.

In some aspects, the environmental variables may include a latitude and/or longitude, an activity, a time of day, a weather forecast, a duration of use, and/or a specific person associated with the 3-D model. In such aspects, the sun exposure may be modeled in a customizable way. For example, an environmental variable may be a latitude and/or longitude associated with the geographic location where a garment may likely be worn. For example, the garment may be intended to be worn in Eugene, Oreg. (located at 44° N, −123° E). For another example, the garment may be intended to be worn at a predetermined latitudinal and/or longitudinal range. For example, the garment may be intended to be worn between 30° N and 40° N. It will be understood by those skilled in the art that any level of specificity of the latitude and/or longitude coordinates may be used in aspects herein. For example, 44.04992° N may be a more accurate representation of the latitude of Eugene, Oreg.

For another example, the sun exposure may be determined, at least in part, based on an intended time the garment is to be worn. In various aspects, this may include a predetermined start time, end time, half-time, and/or any time between a start time and end time. Further, the duration of use may be used to model sun exposure. For example, the duration may represent the anticipated, predicted, mean, median, and/or mode time in which an activity associated with the garment's intended use lasts. For example, the average (mean) time for a track-meet may be 6 hours.

For yet another example, a weather forecast may be determined by any suitable method and used as an environmental variable for sun exposure modeling. As such, sun exposure may change based on cloud-cover, precipitation, snow fall, and/or the like. For yet a further example, an activity associated with the garment/3-D model may modify the modeled sun exposure. For instance, a swimming suit/swimmer model may have a, at least partially, different modeled sun exposure than a soccer jersey/soccer player model since the swimmer would more likely be in a prone position during activity as compared to the soccer player.

In block 303, zone(s) for application of reflective material are determined. In general, the determination of a zone is based on sun exposure, such as the modeled sun exposure from block 302. For example, in some aspects of block 303, a map of sun exposure for different parts of a 3-D model, such as a map produced in block 302, may be analyzed to determine at least one first zone of high sun exposure for the application of a continuous reflective material. In some aspects of block 303, the determination of a zone of high sun exposure may be based, at least partially, on the intensity and/or the duration of sun exposure indicated by the exposure map generated in block 302. As described in reference to block 303, high sun exposure may refer to sun exposure that would be damaging to human skin. It will be understood by those skilled in the art that any suitable metric may be used to determine what would be damaging to human skin.

In aspects, and where a numerical score is assigned based on levels of sun exposure, the different zones described herein may be based on a numerical range. Using the example above, where 0 may indicate no sun exposure, and 100 may indicate maximum sun exposure, a first zone may comprise a range of about 60-100, a second zone may comprise a range of about 30-60, and a third zone may comprise a range of about 0-30. These are just illustrative examples, and it is contemplated herein, that zones of high sun exposure may be determined in a number of different ways.

The number, location(s), surface area, and/or shape(s) of the determined first zone(s) may vary because the areas of sun exposure determined in block 302 may vary based on the at least one environmental variable associated with the generation of the exposure map. As such, in some aspects, block 303 may determine one first zone, one or more first zones, or a plurality of first zones for application of reflective material. In some aspects, the zones may be mapped onto a representation of a garment. For example, as depicted in FIG. 1A-C a single first zone, such as first zone 101 may be determined and a single second zone, such as second zone 102 may be identified for the application of a reflective material.

Further, in some aspects, block 303 may determine at least one second zone for the gradient application of the reflective material. In some aspects, the map of sun exposure for different parts of the 3-D model may be analyzed to determine at least one zone of medium sun exposure. In an aspect, a zone of medium sun exposure may be determined to be a second zone. Additionally, and/or or alternatively, block 303 may determine at least one second zone for the gradient application of reflective material based on the first zone for the continuous application of reflective material. In other words, the determination of the location, shape, and/or surface area of the second zone may be, at least partially, based on the location, shape, and/or surface area of the first zone. In an aspect, the first zone and the second zone may be contiguous. In an aspect, each first zone may be contiguous with an associated second zone. In an aspect, the first zone and the second zone may not be contiguous. As used throughout this disclosure, the term "contiguous" may be defined as substantially touching or sharing a portion of at least one border.

Figure 2D:
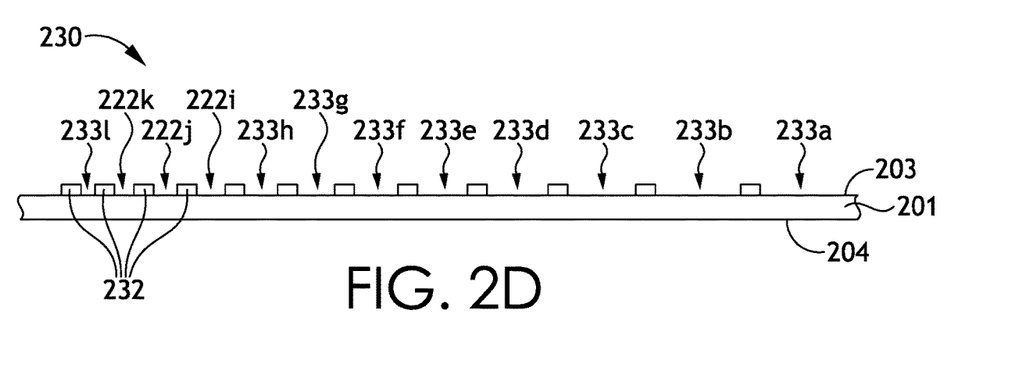
FIG. 2D illustrates yet another exemplary gradient profile of a reflective material on an outer surface of a portion of an exemplary garment in accordance with aspects thereof.

In some aspects, determining the second zone(s) may further comprise determining a gradient profile for the second zone, such as those discussed in reference to FIG. 2B-2D. In some aspects, the gradient profile may be determined based on the modeled sun exposure. In an embodiment, the gradient profile may be determined based on the modeled sun exposure and aesthetic preferences of the person, sport, team, activity, and/or role associated with the garment. For example, block 303 may select gradient profile 210 of FIG. 2B when the modeling indicates that sun exposure is substantially uniform throughout the second zone. For another example, block 303 may select gradient profile 220 of FIG. 2C when the modeling indicates that sun exposure gradually lessens as you move inferiorly down the garment. However, these examples, like the others herein, are illustrative examples and should not be considered limiting.

Further, some aspects of block 303 may further comprise receiving a representation of a garment and mapping the zone(s) for the application of reflective material onto the representation of the garment. In some aspects, this may create a mapped representation of the garment which may facilitate a suitably configured controller device, such as controller device 403 in FIG. 4, to produce computer-based manufacturing instructions for the automated application of reflective material to the outer surface of the garment at least partially based on the zone(s).

In block 304, the reflective material may be applied to the outer surface of a garment, at least partially, based on the determined zone(s). In some aspects, the application of the reflective material may be based on the first zone(s) determined in block 302. In some aspects, the application of the reflective material may be based on the first zone(s) and second zone(s) determined in block 302. Some aspects of block 304 may be facilitated by an application device 404, such as a sprayer in FIG. 4. Some aspects of block 304 may further comprise receiving a garment associated with the mapped representation of the garment, selectively adjusting a volume of the reflective material sprayed by a set of a plurality of nozzles, and/or selectively activating or deactivating a set of a plurality of nozzles.

Figure 4:
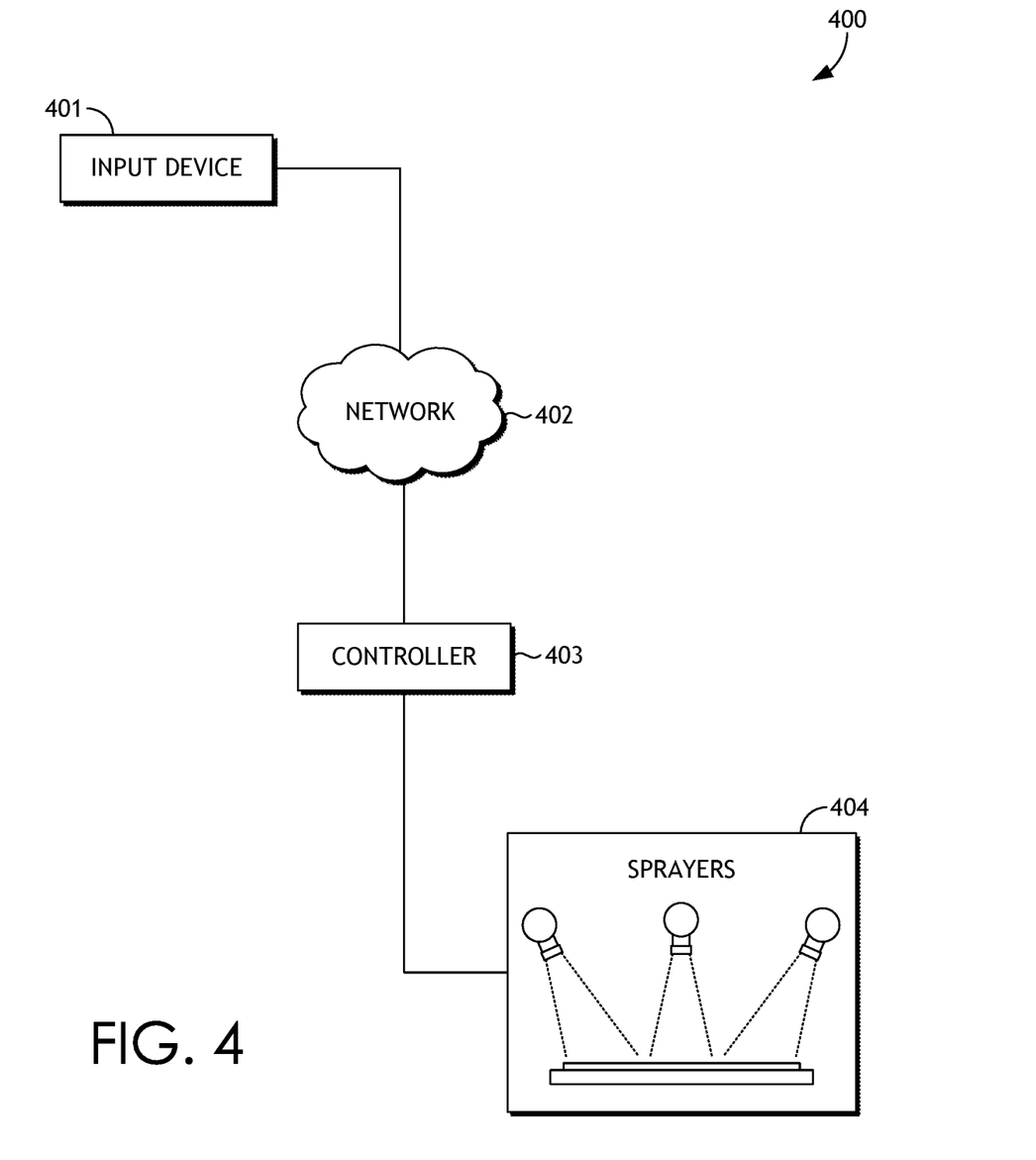
FIG. 4 illustrates an exemplary system for the selective deposition of reflective material based on sun exposure in accordance with aspects thereof.

Turning now to FIG. 4, an exemplary system 400 configured for selective deposition of reflective material on a garment is provided in accordance with aspects herein. Generally, exemplary system 400 facilitates the manufacture of a garment with at least one zone of reflective material applied thereon, wherein the number, surface area, width, shape, and/or location of the at least one zone is based on modeled sun exposure. Further, in some aspects exemplary system 400 may be configured to, at least partially, manufacture a garment with at least one first zone comprising a continuous application of reflective material and at least one second zone with a gradient application of reflective material. As such, aspects of exemplary system 400 may use methods described herein, such as exemplary method 300, to produce garments described herein, such as exemplary garment 100. Some aspects of exemplary system 400 may comprise: an input device, such as input device 401, generally configured to receive a 3-D model of a human body and model sun exposure on the 3-D model; a network, such as network 402, generally configured to facilitate communication between an input device and a manufacturing-controller; a manufacturing-controller, such as controller 403, generally configured to create computer-based manufacturing instructions for a communicatively coupled manufacturing device, such as application device 404, where the application device 404 is generally configured to apply reflective material(s) to the outer surface of a garment in response to receiving instructions from a manufacturing-controller. This exemplary system 400 is but one example of a suitable environment that may be implemented to carry out aspects of the present invention, and is not intended to suggest any limitation as to the scope of use or functionality of the invention. Neither should the illustrated exemplary system 400 be interpreted as having any dependency or requirement relating to any one or combination of the components 401, 402, 403, and/or 404.

Input device 401 is generally configured to receive a 3-D model of a human body. In an aspect, input device 401 may be any computing device suitable to receive such a model. In some aspects, the input device 401 may receive an already generated 3-D model. For example, a 3-D model may be generated at a remote location by any suitable body scan, motion capture, composite image, and/or computer modeling technique. In some aspects, the input device may generate the 3-D model based on information received from communicatively coupled devices (not depicted). In an aspect, these communicatively devices may be a body-scanner, camera array, motion capture device, or the like. For example, input device 401 may receive information from a body-scan of a particular person and in response, generate a 3-D model of the particular person based on the information from the body scan. Further, in some aspects, input device 401 may receive a 3-D model, like those discussed in reference to FIG. 3, through any suitable means.

In some aspects, input device 401 may further model sun exposure on the 3-D model as discussed in reference to block 302 of FIG. 3. For example, in some aspects, input device 401 may simulate, model, calculate, emulate, and/or predict the mean, median, mode, maximal, and/or minimal sun exposure for the 3-D model based on at least one environmental variable. The environmental variables may include a latitude and/or longitude, an activity, a time of day, a weather forecast, a duration of use, and/or a specific person associated with the 3-D model as discussed in regards to FIG. 3.

Further, input device 401 may be further configured to generate a map of the modeled sun exposure and determine at least one zone for the application of reflective material based on the map. The location(s), number, surface area, width(s), and shape(s) of the zone(s) may vary based on the environmental variables used to model the sun exposure. In some aspects, input device 401 may receive a representation of a garment and map the zone(s) for the application of reflective material onto the representation of the garment. In some aspects, this may comprise mapping at least one first zone for application of a continuous layer of reflective material, as discussed in reference to FIG. 3. In an aspect, this may comprise mapping at least one first zone for application of a continuous layer of reflective material and mapping at least one second zone for the application of a gradient of reflective material, as discussed in reference to FIG. 3. In some aspects, the input device may build a library comprising a plurality of representations of garments. In some aspects, input device 401 may receive a user selection of a representation of a garment. In some aspects, input device 401 may further be configured to transmit information, such as a data file, of the mapped representation of a garment to a computing device configured to convert the data file into computer readable reflective material deposition instructions, such as controller 403.

Network 402 is generally configured to facilitate communicative connectivity between various components of exemplary system 400. As such, network 402 may be any connection system utilizing any communication method known in the relevant field. For instance, Network 402 may be a LAN, WAN, WiFi, telecommunication network, intranet, internet, cloud network, and/or any and all similar systems and or methods. Further, although exemplary system 400 depicts network 402 facilitating communication between input device 401 and controller 403 this is intended to be merely illustrative and not limiting. For example, in some aspects, network 402 may facilitate communication between any and all of the components of exemplary system 400, and/or network 402 may facilitate communication between multiple instances (not depicted) of each component in the system.

A computing device, such as controller 403, generally converts the output file from an input device, such as input device 401 into computer-readable instructions for a communicatively coupled manufacturing device, such as application device 404. For example, in an aspect, controller 403 may generate computer readable instructions that ensure application device 404 orients a garment in the appropriate way for application of reflective material on the determined zone(s). In an aspect, controller 403 may generate computer readable instructions that position at least one reflective material sprayer associated with application device 404 in an appropriate position to ensure application of the reflective material in an area on the garment corresponding to at least one determined zone. In an aspect, controller 403 may generate computer readable instructions that activate and/or deactivate at least one reflective material sprayer associated with application device 404 to ensure application of the reflective material with the consistency associated with at least one determined zone. For example, controller 403 may generate computer readable instructions that deactivate a sprayer associated with a region of the garment corresponding to the location of a second zone with a gradient profile determined by input device 401. As such, controller 403 may facilitate the application of reflective material at least partially consistent with the gradient profile by selective activation/deactivation of at least one sprayer.

Continuing, additionally, and/or alternatively, in an aspect, controller 403 may generate computer readable instructions that adjust the volume of reflective material sprayed by at least one sprayer associated with application device 404 to ensure application of the reflective material with the consistency associated with at least one determined zone. For example controller 403 may generate computer readable instructions that at least partially reduce the volume of reflective material sprayed by at least one sprayer on to a region of the garment corresponding to a location of a second zone with the gradient profile determined by input device 401. As such, controller 403 may facilitate the application of reflective material at least partially consistent with the gradient profile by selective modification of at least one sprayer.

Still further, in an aspect, controller 403 may generate computer readable instructions that reposition the garment during the application of the reflective material. For example, a region of the garment's outer surface corresponding to at least one zone may be initially positioned such that the reflective material cannot be applied. In such a scenario, controller 403 may generate instructions to turn, move, or otherwise reposition the garment such that the previously obscured portion of the garment is exposed to at least one sprayer. In some aspects, controller 403 may be, at least, intermittently communicatively coupled to a manufacturing device, such as application device 404, such that the computer readable instructions may be transmitted to the manufacturing device. In aspects this may be done in near real time, intermittently, periodically, or in response to a user input.

Manufacturing device, such as application device 404, is generally configured to receive the computer readable instructions transmitted by controller 403 and to perform the corresponding actions such that reflective material may be applied to a garment. Further, application device 404 may be configured to receive a garment corresponding to the representation of a garment with at least one zone of sun exposure mapped onto the garment representation. For example, a 3-D model of a human may be used to model sun exposure and determine at least one zone for application of reflective material. The at least one zone may be mapped onto a representation of a jersey shirt. Computer readable instructions may be generated based on the at least one zone which instruct an application device, such as application device 404, to apply the reflective material on the outer surface of a jersey shirt corresponding to the representation of the jersey shirt. In turn, the application device 404 may then apply the reflective material to the jersey shirt based on the instructions.

In some aspects, application device 404 may comprise a plurality of computer controlled sprayers. In some aspects, each of the plurality of computer controlled sprayers may be individually activated/deactivated and/or the volume of reflective material sprayed by each of the plurality of computer controlled sprayers may be independently controlled. For example, the computer readable instructions received by application device 404 may activate a first sprayer with 100% volume, deactivate a second sprayer, activate a third sprayer with 25% volume, activate a fourth sprayer with 10% volume, deactivate a fifth sprayer, and so on. In some aspects, the selective activation/deactivation and/or volume control of each of the plurality of sprayers may facilitate substantially simultaneous application of at least one first zone of continuous reflective material and at least one second zone of gradient reflective material. In some aspects, at least partially in response to the computer readable instructions, application device 404 may perform the physical spraying of the reflective material onto the outer surface of a garment such that reflective material is applied to the outer surface based on the zone(s) mapped onto the representation of the garment. For example, application device 404 may verify the proper orientation of the garment, adjust each of the plurality of sprayers according to the instructions, and spray the reflective material onto the outer surface of the garment. Additionally, application device 404 may detect the orientation of the garment, determine adjustments necessary to place the garment into a proper orientation, and automatically adjust the garment from the detected orientation to the proper orientation. Further, in some aspects, the application device 404 may detect the orientation of the garment and automatically adjust the instructions to match the detected orientation of the garment. In some aspects, at some point in time after application of the reflective material is complete the application device may automatically remove the sprayed garment and repeat the process with another similar and/or different garment.

Although application device 404 is described as a spraying device; it is contemplated herein that the computer-generated deposition instruction can also be used by other types of application devices. For example, it is contemplated herein that application of the reflective material may comprise the use of screen printing, 2-D printing, 3-D printing, sonic welding, electrostatic adhesion, thermal bonding, and the like. As such, in an aspect controller 403 may generate computer-generated deposition instructions for one, more than one, and/or a plurality of application devices such that the physical application of the reflective material onto the outer surface of a garment may be facilitated by spraying, screen printing, 2-D printing, 3-D printing, sonic welding, electrostatic adhesion, thermal bonding, and/or the like.

Returning to FIGS. 1A-1C, in some aspects, the location, surface area, width, shape, and/or number of the first zone 101 and/or the second zone 102 may be determined by a method, such as method 300 in FIG. 3, and/or a system, such as system 400 in FIG. 4, that maps sun exposure on to a three-dimensional (3-D) representation of a human body. For example, in an aspect, the 3-D model or representation may comprise a generic model of a human, a gender specific generic model (generic male/generic female), and/or a customizable model, as discussed in reference to FIG. 3. In an aspect, the 3-D model may be a product of a body scan, motion capture, composite image of an individual, and/or the like, as discussed in reference to FIG. 3. In an aspect, the 3-D model may be representative of the prototypical/average person who plays a particular sport and/or sport position, as discussed in reference to FIG. 3. In an aspect, the 3-D model may be representative of the prototypical/average person at a given "level" of a particular sport, as discussed in reference to FIG. 3. For another example, the 3-D model may be representative of the prototypical/average person who plays for a particular team, as discussed in reference to FIG. 3. For another example, in some aspects, the sun exposure and determination of the first zone 101 and/or the second zone 102 may be determined by a method, such as method 300, and/or a system, such as system 400, that models sun exposure, based on at least one environmental variable, and determines at least one zone for the application of reflective material.

Turning now to FIGS. 2A-D, cross-sectional views of a portion of an exemplary garment substrate is provided in accordance with aspects herein. FIG. 2A depicts a continuous layer 202 of a reflective material 202 on the outer surface 203 of a portion of an exemplary garment 201, wherein the exemplary garment 201 has an inner surface 204 and an outer surface 203. In aspects, the reflective material 202 may be sprayed, printed, or otherwise deposited onto the outer surface 203 of the garment 201. However, it is also contemplated herein that the reflective material 202 may comprise a continuous film or sheet (i.e., a film or sheet without voids) that is layered on the outer surface 203 of the garment 201.

FIG. 2B depicts an exemplary gradient profile 210 of a reflective material 212 on the outer surface 203 of a portion of the exemplary garment 201. For example, the gradient profile 210 may comprise a plurality of segments of the reflective material 212 applied discontinuously to the garment 201 via, for instance, selective spraying or application of the reflective material 212 on the garment 201, or via selective deposition of film or sheet segments of reflective material 212 to the garment 201. As shown, the gradient profile 210 comprises areas having the reflective material 212 separated by spaces 213 in which the reflective material 212 is absent or not present. In an aspect, the gradient profile 210 may be a gradient profile associated with the second zone 102. As depicted in 210, in one exemplary aspect, the reflective material 212 applied to the outer surface 203 may be substantially consistent in surface area and/or width throughout the gradient profile 210. Further, the spaces 213 between the reflective material 212 may be consistent throughout the gradient profile 210.

FIG. 2C depicts an exemplary gradient profile 220 of a reflective material 222*a-i* on the outer surface 203 of a portion of the exemplary garment 201. For example, the gradient profile 220 may comprise a plurality of segments of the reflective material 222*a-i* applied discontinuously to the garment 201 via, for instance, selective spraying or application of the reflective material 222*a-i* on the garment 201, or via selective deposition of film or sheet segments of reflective material 222*a-i* to the garment 201. As shown, the gradient profile 220 comprises areas having the reflective material 212 separated by spaces 223 in which the reflective material 222*a-i* is absent or not present. In an aspect, the gradient profile 220 may be a gradient profile associated with the second zone 102. As depicted in 220, the surface area and/or width of the reflective material 222*a-i* applied to the outer surface 203 may be variable throughout a gradient profile, such as gradient profile 220, in some aspects, while the spaces 223 between the reflective material 222*a-i* may remain generally constant. In other words, reflective material 222*a* may be a first surface area and/or width, reflective material 222*b* may be a second surface area and/or width, reflective material 222*c* may be a third surface area and/or width, reflective material 222*d* may be a fourth surface area and/or width, reflective material 222*e* may be a sixth surface area and/or width, and so on.

Continuing, in exemplary aspects, the largest reflective material 222a in the gradient profile 220 may be contiguous with the continuous reflective material 202 as shown in FIG. 2A. To describe it a different way, the continuous reflective material 202 may gradually transition to the gradient profile 220 shown in FIG. 2C by gradually introducing spaces 223 between the different segments of the reflective material 222. For example, in an aspect the continuous reflective material 202 may transition to reflective material 222a, then space 223, then reflective material 222b, then space 223, then reflective material 222c, then space 223, then reflective material 222d, and so on. As stated, in the exemplary aspect shown in FIG. 2C, the spaces 223 between the reflective material 222 may be consistent throughout the gradient profile 220.

FIG. 2D depicts yet another exemplary gradient profile 230 of a reflective material 232 on the outer surface 203 of a portion of the exemplary garment 201. In an aspect, the gradient profile 230 may be a gradient profile associated with the second zone 102. As depicted in 230, the surface area and/or width of the reflective material 232 applied to the outer surface 203 may be consistent throughout the gradient profile 230, in some aspects. In the exemplary aspect shown in FIG. 2D, although the individual segments of the reflective material 232 may comprise the same surface area, the spaces 233a-1 between the reflective material 232 may be variable throughout the gradient profile 230. For example, the smallest space 233k may be located substantially proximate to the continuous reflective material 202, as show in FIG. 2A. To describe it in a different way, the continuous reflective material 202 may gradually transition to gradient profile 230 show in in FIG. 2D by gradually introducing wider spaces 233a-1 between the different segments of the reflective material 232. For example, in an aspect, the continuous reflective material 202 may transition to reflective material 232, then space 233l, then reflective material 232, then space 233k, then reflective material 232, then space 233j, then reflective material 232, then space 233i, and so on. Any and all of the aspects shown in FIGS. 2A-2D, and any variation thereof, are contemplated as being within aspects herein.

Although depicted in FIG. 2A-D as having a "squared-off" appearance, it is contemplated that the reflective material (such as reflective material 202, 212, 222a-i, and 232) may comprise other configuration such as rounded off, domed, substantially spherical, and the like. Further, although depicted in cross-section, when viewing a garment, such as garment 100, from the front, side, or back, the shape of the reflective material (such as reflective material 202, 212, 222a-i, and 232) may comprise a plurality of configurations. In other words, although the reflective material 202 comprising the first zone 101 and the reflective material (212, 222a-i, or 232) comprising the second zone 102, as depicted in FIG. 1A-C, is shown as having a substantially straight border; it is contemplated herein that the first zone 101 and the second zone 102 may comprise any shape (curvilinear, zig-zag, and the like). As such, the shape of the reflective material may comprise any shape.

From the foregoing, it will be seen that this invention is one well adapted to attain all the ends an object set forth above, together with other advantages which are obvious and inherent to the system, method, and garment. It will be understood that certain features and sub-combinations are of utility and may be employed without reference to other features and sub-combinations and are contemplated by and within the scope of the claims. Additionally, not all steps listed in the various figures need be carried out in the specific order described.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present invention.

What is claimed is:

1. A system for manufacturing an upper-body garment with reflective material deposits, the system comprising:
   an input device configured to receive a data file comprising a representation of areas of sun exposure on a three-dimensional (3-D) model of a human body;
   at least one computing device configured to receive the data file from the input device and convert the data file into reflective material deposition instructions that include a continuous application zone, a gradient application zone, and a non-application zone; and
   a spraying device communicatively coupled with the at least one computing device and configured to apply a continuous deposit of reflective material to a first zone of the upper-body garment corresponding to the continuous application zone, apply a gradient deposit of the reflective material to a second zone of the upper-body garment corresponding to the gradient application zone, wherein the gradient deposit of the reflective material comprises a plurality of spaced-apart reflective material rings applied to the upper-body garment such that the plurality of spaced-apart reflective material rings are positioned parallel to an inferior edge of the upper-body garment, and omit application of the reflective material to a third zone of the upper-body garment corresponding to the non-application zone.

2. The system of claim 1, wherein the at least one computing device is further configured to:
   determine, based on the 3-D model of the human body, a maximal or average sun exposure for one or more areas of the 3-D model of the human body;
   map the maximal or average sun exposure for the one or more areas of the 3-D model of the human body onto the upper-body garment; and
   identify, based on the mapping, at least the continuous application zone for application of the reflective material.

3. The system of claim 1, further comprising:
   at least one image capture device configured to capture at least one image of the human body; and
   an image processing device configured to receive data from the at least one image capture device and convert the at least one image into the 3-D model of the human body.

4. The system of claim 1, wherein the 3-D model comprises a plurality of poses, motion capture, or a body scan.

5. The system of claim 1, wherein the input device comprises a scanning device, a video capture device, a motion capture device, or a wearable device.

6. The system of claim 1, wherein the areas of sun exposure on the 3-D model of the human body are determined based on at least one of:
   a latitude;
   a longitude;
   an activity;
   a time of day;
   a weather forecast;

a duration of use; and a specific person associated with the 3-D model.

7. The system of claim 1, wherein a first portion of the continuous application zone is contiguous with a first portion of the gradient application zone.

8. The system of claim 1, wherein the first zone comprises at least two non-contiguous regions of the upper-body garment.

9. A method of manufacturing an upper-body garment having reflective material, the method comprising:

receiving the upper-body garment having an outer surface;

receiving a representation of areas of sun exposure on a three-dimensional (3-D) model of a human body;

determining, based on the areas of sun exposure, a first zone of the upper-body garment corresponding to application of a continuous deposit of a reflective material, a second zone of the upper-body garment corresponding to application of a gradient deposit of the reflective material, and a third zone of the upper-body garment corresponding to omission of the reflective material; and applying the reflective material to the outer surface of the upper-body garment in the first zone and the second zone, wherein applying the reflective material to the outer surface of the upper-body garment in the second zone includes forming a plurality of spaced-apart reflective material rings such that the plurality of spaced-apart reflective material rings are positioned parallel to an inferior edge of the upper-body garment.

10. The method of claim 9, further comprising;

determining, based on the areas of sun exposure, a first gradient profile for the second zone of the upper-body garment corresponding to the application of the gradient deposit of the reflective material; and selectively activating a set of spraying nozzles to initiate the application of the plurality of spaced-apart reflective material rings to the outer surface of the upper-body garment based on the first gradient profile.

11. The method of claim 9, wherein the 3-D model of the human body comprises a representation of the upper-body garment; and wherein the areas of sun exposure are determined based on a maximal or average sun exposure on the representation of the upper-body garment and the first zone is further based on the maximal or average sun exposure.

12. The method of claim 9, wherein the 3-D model comprises a plurality of poses, motion capture, or a body scan.

13. The method of claim 9, wherein the areas of sun exposure on the 3-D model of the human body are determined based on at least one of:

a latitude;

a longitude;

an activity;

a time of day;

a weather forecast;

a duration of use; and a specific person associated with the 3-D model.

14. The method of claim 9, wherein the reflective material comprises vaporized aluminum.

15. The method of claim 9, wherein the applying the reflective material comprises selectively adjusting a volume of the reflective material sprayed by a set of a plurality of nozzles.

* * * * *